No. 694,994. Patented Mar. 11, 1902.
T. F. ROWLAND.
MANUFACTURE OF WELDED PLATE METAL CYLINDERS, &c.
(Application filed Feb. 28, 1901.)
(No Model.)

Witnesses:

Thomas F. Rowland, Inventor by ⎯⎯⎯⎯ Att'y

THE NORRIS PETERS CO., PHOTO-LITHO., WASHINGTON, D. C.

UNITED STATES PATENT OFFICE.

THOMAS F. ROWLAND, OF NEW YORK, N. Y.

MANUFACTURE OF WELDED PLATE-METAL CYLINDERS, &c.

SPECIFICATION forming part of Letters Patent No. 694,994, dated March 11, 1902.

Application filed February 28, 1901. Serial No. 49,277. (No model.)

*To all whom it may concern:*

Be it known that I, THOMAS F. ROWLAND, a citizen of the United States, residing in the borough of Manhattan, city, county, and State of New York, have invented a new and useful Improvement in the Manufacture of Welded Plate-Metal Cylinders and Similar Articles, of which the following is a full, true, and exact description, reference being had to the accompanying drawings.

My invention relates to the welding of plate-metal cylinders, and it relates more particularly to the welding of large plates in cylindrical form or otherwise.

The drawings illustrate the application of my process to the manufacture of a plate-metal cylinder.

Figure 1:
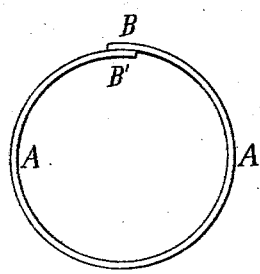
Figure 2:
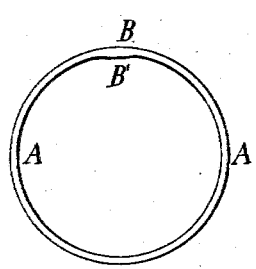
Figure 3:
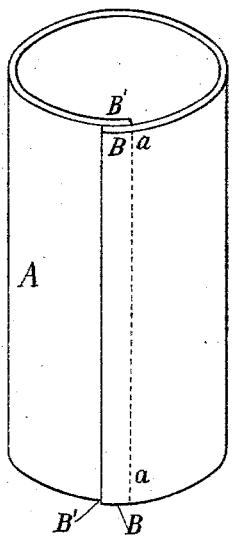

Figure 1 is a cross-section of the cylindrical blank before it is welded. Fig. 2 is a cross-section of the cylinder when welded. Fig. 3 is a view in perspective of the cylindrical blank.

In Fig. 1 a plate A, of substantially rectangular form, of steel or other suitable metal, has been rolled in any suitable manner into cylindrical shape, having its edges overlapping at B B'. The plate is then subjected to heat, so that the edges B B' are sufficiently heated to be welded together. Pressure is then applied in any suitable manner or by any suitable mechanism along the line $a\ a$ of Fig. 3 parallel to the seam to be welded and, as here shown, contiguous to the overlapped edges B B', the area to which pressure is applied at a single instant being of any desired width in a direction transverse to the seam, according to the form of pressure device used. The pressure may of course be applied on a line coincident with the seam, and in using the expression "parallel to the seam" I intend to include lines contiguous to and lines coincident with the seam. Positive pressure may be applied from the outside of the cylinder and also from the inside—that is, both pressure devices may be movable, or, if desired, either of the pressure devices may be stationary and the power be applied solely through the other coacting device. The welding devices apply pressure to the plate simultaneously along a line parallel to the seam, and the pressure may be simultaneously applied to the whole length of the seam or to any desired part of the same. The pressure is then applied to the edges B B' either by moving the plate between the devices communicating the pressure or by moving those devices over the overlapped edges. In this way the entire length of the seam may, if desired, be welded at one time, the weld being usually made more perfect by repeating the operation while the metal remains hot. The entire metal blank should be heated in order that the expansion of the metal, due to the action of the heat, may be equal throughout the entire plate. If only the edges of the plate are heated, the expansion of the edges relative to the body of the plate would be so great that the edges would bulge and could not be brought together for welding purposes. After the entire plate is heated additional heat may, if desired, be applied to the edges for the purpose of getting said edges into a more perfect condition for welding, the additional expansion of the edges being not enough to interfere with the welding process.
The heating of the plate may take place either before or after the plate has been rolled into cylindrical form, and when in the claims I refer to the steps of bringing the edges of the plate or plates together and heating them, I intend to cover the taking of these steps in whichever order may seem desirable. I also consider it desirable, though not necessary, that the cylindrical blank should be supported in a vertical position while being welded, there being less danger of distortion of the cylinder in this position than if the cylinder were held in a horizontal position while being welded. It may also be desirable in some cases to "tack" the edges together by welding together in any suitable way small portions of the edges, so that said edges may be firmly held together before the welding process above described begins.

While the edges of the plate may be brought together in any suitable manner and the welding pressure may be applied only to the parts to be welded, I prefer to apply the pressure not only to the edges of the plate, but also to the parts immediately contiguous thereto, and to cause the line of pressure to pass back and forth over these parts several times, thus not only perfecting the seam, but also strengthening the parts adjacent thereto. That is of great importance, as otherwise while the seam itself may be of greater strength even than the body of the plate that portion of the plate immediately contiguous the welded seam may have been disturbed in structure and slightly weakened by the welding of the seam.

Heretofore in making welded plate-metal cylinders or tubes pressure has always been applied to the edges of the plate by pressure devices which moved in the direction of the seam, so that the line of pressure moved longitudinally along the seam instead of transversely to it, as in my process. In making cylinders out of metal plates of considerable thickness it has been necessary to heat a small portion of the edges and then weld the same, then to heat another small portion and weld it, and by continuing this operation gradually to weld the entire length of the seam. This is because when the edges of the plates are the only portions heated, and when these are brought up to a welding heat the great expansion of the metal along the edges causes heat distortions, which, if any more than a very small portion of the seam is heated at one time, are sufficient to render it practically impossible to maintain the proper relative position of the plates at the seam, and this is especially true where large sheet-metal cylinders or large plates of any form are welded. Since, however, I heat not only the edges of the plate, but also the whole plate, substantially to a welding heat, the plate expands equally, and these heat distortions, which are just mentioned, are prevented, and the plates are maintained in proper relative position at the seam. It is not necessary, however, in all cases to heat the entire extent of the plates to be welded, since it is only necessary to heat a sufficient extent of the plate to prevent heat distortions. The plates in all cases must be brought at the seam to a welding heat, and the parts adjacent the seam must be heated sufficiently to maintain the edges of the plates at the seam in proper relation to each other. Where in the claims I speak of welding large plates or a large extent of a seam or plate, I intend to indicate such an operation as could not be successfully performed under the present practice at a single heat, because of the heat distortion and other causes. Where I state in the claims that I prevent local heat distortions in plates to be welded, I wish to be understood as indicating that the process set forth prevents the occurrence of such distortions to any extent injurious to the proper operation of the welding process, although it may be that such distortions are still present to some slight extent. A weld made in this way is of uniform quality throughout and generally more satisfactory than that made in the manner heretofore customary.

While I have described my process in connection with the manufacture of plate-metal cylinders, it can be used equally well for welding together the edges of one or more plates for other purposes. It is also apparent that my invention may be carried out with various apparatus and in varying manners, and I therefore do not intend to restrict myself to the particular use and manner herein specifically described.

Having thus described my invention, what I wish to secure by Letters Patent is—

1. The herein-described process of welding together the edges of a metal plate or plates, consisting in bringing said edges together, suitably heating the same, and then applying a welding pressure simultaneously along a line parallel with the seam to be welded throughout a large extent of said seam and bringing such pressure to bear on said edges.

2. The herein-described process of welding together the edges of a metal plate or plates, consisting in bringing said edges together and suitably heating the same and then applying a welding pressure on a line parallel with the seam to be welded and bringing said pressure to bear progressively in a direction transverse to said seam upon said edges and the parts contiguous thereto.

3. The herein-described process of making a welded plate-metal cylinder consisting in bending a suitably-shaped metal plate into cylindrical form, bringing the edges thereof together and heating the same, and then applying welding pressure simultaneously along a line parallel to the seam to be welded throughout a large extent of said seam and bringing said pressure to bear upon the said edges.

4. The herein-described process of making a welded plate-metal cylinder consisting in bending a suitably-shaped metal plate into cylindrical form, bringing together and heating the edges thereof, and then applying welding pressure on a line parallel to the seam to be welded and bringing said pressure to bear progressively in a direction transverse to said seam upon said edges and the parts contiguous thereto.

5. The herein-described process of welding the edges of a metal plate or plates consisting in bringing said edges together, heating the entire plate or plates, and then applying a welding pressure simultaneously along a line parallel with the seam to be welded throughout a large extent of said seam and bringing said pressure to bear on said edges.

6. The herein-described process of welding the edges of a metal plate or plates consisting in bringing said edges together, heating the entire plate or plates, and then applying a welding pressure on a line parallel with the seam to be welded and bringing the said pressure to bear progressively in a direction transverse to said seam upon the said edges and the parts contiguous thereto.

7. The herein-described process of making a welded plate-metal cylinder consisting in bending a suitably-shaped metal plate into cylindrical form, bringing the edges thereof together, heating the entire plate, and then applying welding pressure simultaneously along a line parallel to the seam to be welded throughout a large extent of said seam and bringing said pressure to bear on said edges.

8. The herein-described process of making a welded plate-metal cylinder consisting in bending a suitably-shaped metal plate into cylindrical form, bringing the edges thereof together, heating the entire plate, and then applying welding pressure on a line parallel to the seam to be welded and bringing said pressure to bear progressively in a direction transverse to said seam upon said edges and the parts contiguous thereto.

9. The herein-described process of welding the edges of a metal plate or plates consisting in bringing said edges together, heating the entire plate or plates, applying additional heat to the edges thereof, and then applying a welding pressure simultaneously along a line parallel with the seam to be welded throughout a large extent of said seam and bringing said pressure to bear on said edges.

10. The herein-described process of welding the edges of a metal plate or plates consisting in bringing said edges together, heating the entire plate or plates, applying additional heat to the edges thereof, and then applying a welding pressure on a line parallel with the seam to be welded and bringing said pressure to bear progressively in a direction transverse said pressure to bear progressively in a direction transverse to said seam upon said edges and the parts contiguous thereto.

11. The herein-described process of making a welded plate-metal cylinder consisting in bending a suitably-shaped metal plate into cylindrical form, bringing the edges thereof, together, heating the entire plate, applying additional heat to the edges thereof, and then applying welding pressure simultaneously along a line parallel to the seam to be welded throughout a large extent of said seam and bringing said pressure to bear on the said edges.

12. The herein-described process of making a welded plate-metal cylinder consisting in bending a suitably-shaped metal plate into cylindrical form, bringing the edges thereof together, heating the entire plate, applying additional heat to the edges thereof, and then applying welding pressure on a line parallel to the seam to be welded and bringing said pressure to bear progressively in a direction transverse to said seam upon said edges and the parts contiguous thereto.

13. The herein-described method of making a welded plate-metal cylinder consisting in bending a suitably-shaped metal plate into cylindrical form, bringing the edges thereof together, heating the entire cylinder, placing said cylinder in a vertical position, and then applying welding pressure simultaneously along a line parallel to the seam to be welded throughout a large extent of said seam and bringing said pressure to bear on said edges and parts contiguous thereto.

14. The herein-described method of welding metal plates which consists in first securing the edges of such plates in desired position, then in heating said plates throughout their whole extent to substantially a welding heat and then in welding the edges of said plates.

15. The herein-described process of welding metal plates which consists in first bending such plates into cylindrical form, then in securing the edges of such plates in position, then in heating such cylindrical plates throughout their whole extent to substantially the welding heat while in a vertical position and then in welding the edges of such plates.

16. The herein-described process of welding metal plates which consists in bending such plates into cylindrical form, in securing the edges of such plates in position, in heating such plates throughout their whole extent to substantially a welding heat while such plates are in a vertical position and in welding the edges of such plates while in a vertical position.

17. The herein-described process of welding metal plates which consists in bending such plates into a cylindrical form, in securing the edges of such plates in position, in heating such plates throughout their whole extent to substantially a welding heat while in a vertical position, in supplying additional heat to the edges of such plates and in welding the edges of such plates while in a vertical position.

18. The herein-described process of welding large plate-metal cylinders which consists in bending metal plates into a cylindrical form, in securing the edges of such plates in position and heating such plates throughout their whole extent to substantially welding heat and in welding the edges of such plates.

19. The herein-described process of welding large metal plates which consists in bending such plates into cylindrical form, in securing the edges of such plates in position, in heating the adjacent edges of such plates to a welding heat and in heating the parts of such plates adjacent the edges to maintain the edges of such plates in position and in welding the edges of such plates.

20. The herein-described process of welding large metal plates which consists in bringing the edges of such plates into position, in heating the edges of such plates to a welding heat, in heating the portions of such plates adjacent the edges to prevent the distortion by heat of the edges of such plates and in welding the edges of such plates.

21. The herein-described process of welding metal plates which consists in bringing the edges of such plates into position to form a seam, in heating the edges of such plates and parts adjacent thereto throughout a large extent of such seam, to bring the edges of such plates into a condition to be welded and to maintain the edges of such plates in position and in welding such large extent of the seam.

22. The herein-described process of welding metal plates which consists in bringing the edges of such plates together, in heating the edges of such plates and portions adjacent thereto to bring the edges of such plates into condition to be welded and to maintain the edges of such plates in position by preventing local heat distortion and in welding the edges of such plates.

23. The herein-described process of welding metal plates which consists in bending such plates into cylindrical form, in heating the edges of such plates and parts contiguous thereto to bring the edges of such plates into condition to be welded and to maintain such edges in proper position by preventing local heat distortion at such edges and in welding the edges of said plates.

24. The herein-described process of welding large metal plates which consists in bringing the edges of such plates together, in heating the edges of such plates and the parts adjacent thereto throughout a large extent of the seam formed by such edges to bring such edges into condition to be welded and to maintain such edges in proper position by preventing local heat distortion at such edges and by welding such large extent of said seam at one heat.

25. The herein-described process of welding metal plates which consists in bringing the edges of such plates together, in heating such plates to bring a large portion of the edges of such plates into a condition for welding and to prevent local heat distortion at such edges and in welding such plates.

THOMAS F. ROWLAND.

Witnesses:
JULIA E. KNIGHT,
W. WEST.